(12) United States Patent
Ounadjela et al.

(10) Patent No.: US 10,436,026 B2
(45) Date of Patent: Oct. 8, 2019

(54) SYSTEMS, METHODS AND APPARATUS FOR DOWNHOLE MONITORING

(71) Applicant: Schlumberger Technology Corporation, Sugar Land, TX (US)

(72) Inventors: Abderrhamane Ounadjela, Cambridge, MA (US); Jagdish Shah, Redwood, CA (US); Marthe Souquiere, Loc Maria Plouzane (FR); Henri-Pierre Valero, Clamart (FR); Sandip Bose, Cambridge, MA (US); Philippe F. Salamitou, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 34 days.

(21) Appl. No.: 15/300,831

(22) PCT Filed: Mar. 31, 2015

(86) PCT No.: PCT/US2015/023465
§ 371 (c)(1),
(2) Date: Sep. 30, 2016

(87) PCT Pub. No.: WO2015/153537
PCT Pub. Date: Oct. 8, 2015

(65) Prior Publication Data
US 2017/0022806 A1    Jan. 26, 2017

Related U.S. Application Data

(60) Provisional application No. 61/972,415, filed on Mar. 31, 2014.

(51) Int. Cl.
*E21B 47/12* (2012.01)
*E21B 49/00* (2006.01)
(Continued)

(52) U.S. Cl.
CPC ............ *E21B 49/006* (2013.01); *E21B 43/26* (2013.01); *E21B 47/12* (2013.01); *G01V 1/288* (2013.01);
(Continued)

(58) Field of Classification Search
CPC ..................................................... E21B 47/122
See application file for complete search history.

(56) References Cited

U.S. PATENT DOCUMENTS 4,866,607 A * 9/1989 Anderson ............... E21B 47/00
                                                                702/11
4,921,048 A * 5/1990 Crow .................... E21B 43/121
                                                                137/624.2
(Continued)

OTHER PUBLICATIONS

International Search Report and Written Opinion for International Application No. PCT/US2015/023465, dated Jul. 7, 2015. (11 pages).

(Continued)

*Primary Examiner* — William D Hutton, Jr.
*Assistant Examiner* — Steven A MacDonald
(74) *Attorney, Agent, or Firm* — Eileen Pape (57) ABSTRACT

A downhole monitoring system and method that includes a sensor system with a sensor array with a number of sensors and a hub. Data measured by the sensors is processed by the hub and wirelessly communicated to a smart node. The sensor system may be mounted in the annulus formed between a borehole wall and an exterior surface of a well casing. The sensors may be configured to monitor the formation for microseismic events generated during hydraulic fracturing. The fracture growth and propagation may be monitored using the data obtained by the sensors. The data may facilitate real time control of the hydraulic fracturing operation.

17 Claims, 5 Drawing Sheets

(51) Int. Cl.
*G01V 1/46* (2006.01)
*G01V 1/28* (2006.01)
*E21B 43/26* (2006.01)
*G01V 1/48* (2006.01)

(52) U.S. Cl.
CPC .............. *G01V 1/46* (2013.01); *G01V 1/48* (2013.01); *G01V 2210/1234* (2013.01); *G01V 2210/646* (2013.01)

(56) References Cited

U.S. PATENT DOCUMENTS

| | | | | |
|---|---|---|---|---|
| 5,503,225 | A * | 4/1996 | Withers | B09B 1/008 |
| | | | | 166/250.1 |
| 5,684,693 | A * | 11/1997 | Li | E21B 47/12 |
| | | | | 702/6 |
| 5,784,004 | A * | 7/1998 | Esfahani | E21B 47/06 |
| | | | | 166/250.01 |
| 6,131,658 | A | 10/2000 | Minear | |
| 6,405,136 | B1 * | 6/2002 | Li | E21B 47/04 |
| | | | | 175/45 |
| 7,107,153 | B2 * | 9/2006 | Kisra | G01V 3/34 |
| | | | | 702/6 |
| 7,249,636 | B2 | 7/2007 | Ohmer | |
| 7,543,635 | B2 | 6/2009 | East et al. | |
| 8,584,519 | B2 * | 11/2013 | Maida | E21B 47/16 |
| | | | | 73/152.54 |
| 9,334,718 | B2 | 5/2016 | Valero et al. | |
| 9,394,785 | B2 * | 7/2016 | Goodwin | E21B 33/13 |
| 9,464,512 | B2 * | 10/2016 | Kalia | E21B 43/16 |
| 9,790,785 | B2 * | 10/2017 | Fripp | E21B 47/14 |
| 9,896,926 | B2 * | 2/2018 | Steele | E21B 33/16 |
| 2004/0263350 | A1 | 12/2004 | Vinegar et al. | |
| 2005/0284659 | A1 | 12/2005 | Hall et al. | |
| 2007/0215345 | A1 * | 9/2007 | Lafferty | E21B 43/26 |
| | | | | 166/250.1 |
| 2007/0223822 | A1 * | 9/2007 | Haugland | G01V 11/002 |
| | | | | 382/232 |
| 2008/0106972 | A1 * | 5/2008 | Liang | E21B 47/12 |
| | | | | 367/25 |
| 2009/0019271 | A1 | 1/2009 | Kawakami | |
| 2009/0192711 | A1 * | 7/2009 | Tang | E21B 47/12 |
| | | | | 702/6 |
| 2009/0283259 | A1 | 11/2009 | Poitzsch et al. | |
| 2011/0094732 | A1 | 4/2011 | Lehman et al. | |
| 2011/0186290 | A1 * | 8/2011 | Roddy | E21B 43/25 |
| | | | | 166/253.1 |
| 2014/0002089 | A1 * | 1/2014 | Wood | G01V 3/20 |
| | | | | 324/366 |
| 2014/0265565 | A1 * | 9/2014 | Cooley | H02P 6/18 |
| | | | | 307/18 |
| 2015/0014521 | A1 * | 1/2015 | Barfoot | E21B 47/123 |
| | | | | 250/261 |
| 2016/0230533 | A1 * | 8/2016 | Steele | E21B 33/16 |
| 2017/0022806 | A1 * | 1/2017 | Ounadjela | E21B 49/006 |

OTHER PUBLICATIONS

Mesohoryanakis et al. A Study on Multiphase Composites for Acoustic Inhomogeneous Impedance Matching Layers. Bulgarian Journal of Physics 26, (1999) p. 53-64.

International preliminary report on patentability issued in the related PCT application PCT/US2015/023465, dated Oct. 13, 2016 (10 pages).

* cited by examiner

といsystems, methods and apparatus for downhole monitoring

SYSTEMS, METHODS AND APPARATUS FOR DOWNHOLE MONITORING

RELATED APPLICATIONS

This application claims the benefit of a related U.S. Provisional Application Ser. No. 61/972,415 filed Mar. 31, 2014, entitled "HYDRAULIC FRACTURE MONITORING COMBINING BEHIND CASING DEPLOYMENT AND WIRELESS TELEMETRY" to Abderrhamane Ounadjela et al., the disclosure of which is incorporated by reference herein in its entirety.

BACKGROUND

The following descriptions and examples are not admitted to be prior art by virtue of their inclusion in this section.

Hydrocarbon fluids such as oil and natural gas are obtained from a subterranean geologic formation, referred to as a reservoir, by drilling a well that penetrates the hydrocarbon-bearing formation. Once a wellbore is drilled, the formation may be stimulated via hydraulic fracturing. Monitoring and controlling the propagation of the hydraulic fractures has taken on increased significance in recent years due to regulatory and environmental concerns. One method used to monitor the propagation of a hydraulically induced fracture is to monitor the emission of micro-seismic events which occur as the formation responds to the increasing hydraulic pressure. These naturally occurring source events can be detected and located using seismic monitoring techniques.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the claimed disclosure may comprise a downhole monitoring system that includes a sensor system located in an annulus formed between a borehole wall and an exterior surface of a casing. The sensor system may include a sensor array comprising a plurality of sensors and a hub communicatively coupled to the sensor array. The hub may include an energy storage, a hub wireless telemetry system and a data processor. The hub wireless telemetry system may be configured to communicate with a smart node located in the wellbore formed by the casing. The smart node may comprise a smart node wireless telemetry system and a surface telemetry unit communicatively coupled to a surface acquisition unit. The hub may be configured to provide power to the sensor system, process data from the sensors of the sensor array and wirelessly communicate the processed data to the surface acquisition unit via the smart node and the surface telemetry unit.

Embodiments of the claimed disclosure may comprise a method for sensing micro-seismic activity during a hydraulic fracturing operation. The method may include cementing a sensor system comprising a sensor array and a hub into an annulus defined between an interior of a borehole wall and an exterior of a casing and positioning, proximate to the hub, a smart node communicatively coupled to a surface acquisition unit. The method may then comprise initiating wireless communications between the hub and the smart node and performing a hydraulic fracturing operation. Further in the method, the process may comprise compressing data in received in the hub from sensors of the sensor array and wirelessly communicating the compressed data to the smart node. In addition, the method may comprise monitoring fracture propagation in real time at the surface acquisition unit during the hydraulic fracturing operation due to the compressed data received by the smart node.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

Moreover, inventive aspects lie in less than all features of a single disclosed embodiment. Thus, the claims following the Detailed Description are hereby expressly incorporated into this Detailed Description, with each claim standing on its own as a separate embodiment.

Hydraulic fracturing is a primary technique for improving well productivity by placing or extending channels or fractures from the wellbore to the reservoir. Such fractures are created by injecting a fracturing fluid into a wellbore penetrating a subterranean formation, and forcing the fracturing fluid against the formation strata by pressure. The formation strata or rock is forced to crack, creating or enlarging one or more fractures. The fracturing fluid contains proppants, which prevent the fracture from closing, and thus the fracture provides improved flow of the recoverable fluids, i.e. oil, gas or water.

Such fracturing may be carried out at several locations in the wellbore in what is known as multi-zone fracturing. To accomplish this, each zone is isolated such that the fracturing fluid is directed only in that zone. Accordingly, fracturing may be carried out in the most effective way across a number of zones or at multiple locations within a single zone.

The geometry of the hydraulic fracture directly affects the efficiency of the process and the success of the operation. Estimating the geometry of the fracture is a primary objective in order to quantify the success of the fracturing operation. To accomplish this, several methods are currently used: pressure analysis, tiltmeter observational analysis, and microseismic monitoring of hydraulic fracture growth. For example, analysis of acoustic signals caused by microseismic events during a fracturing operation can provide valuable information about the geometry of the fracture. If such signals are acquired in real time, they can help optimize the fracturing operation from a cost as well as performance perspective.

These measurements are often made by installing appropriate sensors in a nearby well at some distance from the treatment well. In other cases, sensors may be placed on the surface to measure the micro-seismic events. However, surface noise and lack of availability as well as cost of a nearby well may render these methods less desirable.

Figure 1:
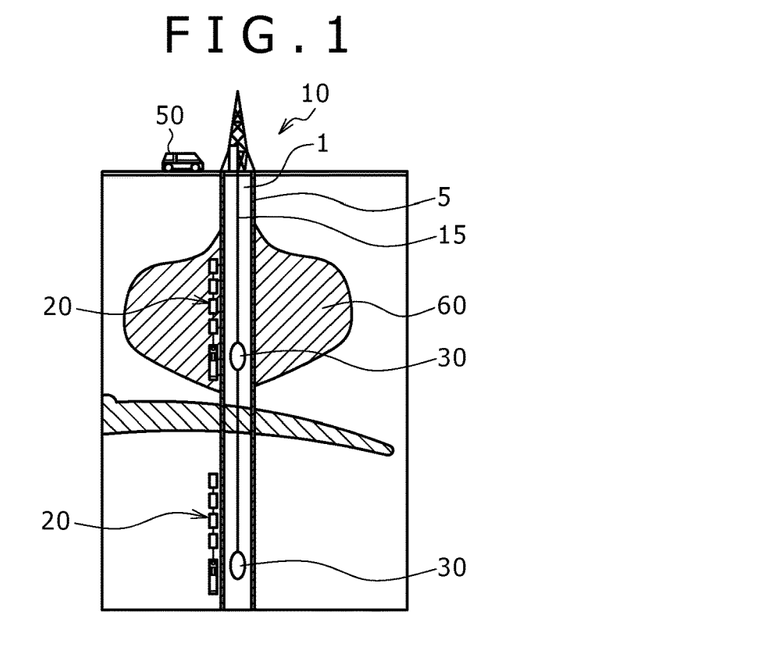
FIG. 1 is a schematic illustration of a downhole monitoring system communicating, according to an embodiment of the disclosure.

At least some embodiments of the current disclosure are configured to acquire real-time data from sensors placed within the treatment well. Referring generally to FIG. 1, embodiments of a monitoring system 10, may comprise a hybrid combination of wired and wireless telemetry by using a sensor system 20 comprising groups of sensors attached to an array hub 40, in which each group has a power supply, a transceiver, and local data storage and processing capabilities. These aspects will be described in more detail later.

The treatment well may contain a wellbore 1 extending through a formation 60. In some embodiments, the wellbore 1 is lined with casing 5 and the sensor system 20 may be installed behind the casing 5 during well construction. This hybrid scheme may communicate the data measured by the sensor system 20 to the surface in real time for further processing so that a fracturing operation may be optimized in real time, e.g., during the operation. As shown in this embodiment, the information may be communicated via one or more smart nodes 30, wirelessly communicating with the sensor systems 20. The smart nodes 30 may be conveyed into the wellbore 1 via a wireline cable 15, or other form of suitable conveyance. The information exchanged between the sensor systems 20 and the smart nodes 30 may be further exchanged with a surface acquisition system 50 coupled to the smart nodes 30 via the wireline cable 15 or other communications conduit or method.

Figure 2:
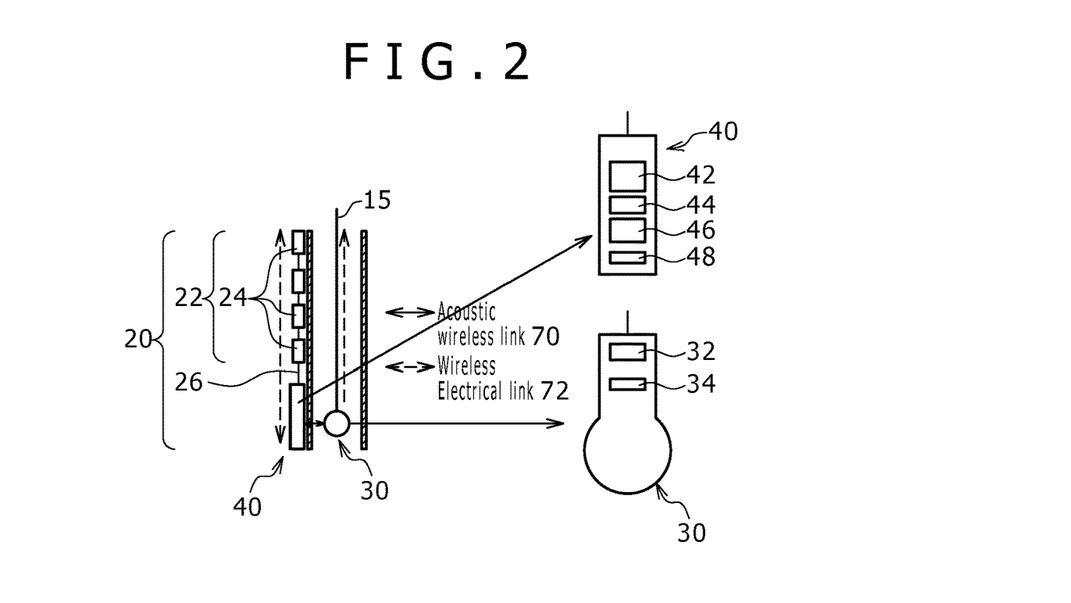
FIG. 2 is a single sensor system and smart node set from the downhole monitoring system shown in FIG. 1, including detailed schematics of the hub and smart node, according to an embodiment of the disclosure.

Referring to the exemplary embodiment shown in FIG. 2, each of the sensor systems 20 may include groups of sensors 24 provided in a sensor array 22 coupled to an array hub 40. The sensor array 22 may be communicatively coupled to the array hub 40 via a cable 26. The sensor system 20 should be sufficient to efficiently monitor a stimulation job. The sensor systems 20 may be permanently installed behind the casing in the annulus between the casing and the borehole wall of the wellbore 1.

The sensors 24 in the sensor array 22 may be any sensor or combinations of sensors configured for downhole monitoring activity, such as microseismic sensors, geophones, hydrophones, distributed vibration sensors (DVS—fiber optic systems), pressure, temperature, and other sensors not listed or currently developed. The sensors 24 may be directly coupled to one another via cable 26 or in some embodiments, wirelessly coupled together. In addition to being installed behind the casing 5, the sensors 24 may be in direct contact with the formation 60 or in indirect contact via cement used to install the casing 5 or other forms of packing or filler material in the annulus. Therefore, the sensors 24 are well coupled to the formation 60 and are capable of detecting small seismic events at high frequencies. Data measured by the sensor array 22 are provided to the array hub 40.

Embodiments of the array hub 40 may include a data processor 42, performing functions such as data acquisition and communications with the sensor array 22, data processing, data reduction and data storage. The data processor 42 should be capable of processing and compressing the data acquired by the sensor array 22 into a minimal set of seismic event signatures. Other embodiments may have the data processor 42 configured to either go or be put into a sleep mode or a low power mode, where electrical power consumption is negligible. During this mode, the data processor 42 may maintain the capability of being awaken by an electrical signal received by an ultra-low power receiving unit 48. Once awakened, the data processor 42 may power up the rest of the sensor system 20 in order to monitor formation 60 activity.

In some embodiments, the array hub 40 will also include energy storage 44 such as a battery pack or other storage device such as a capacitor bank for example. The array hub 40 may further include a hub wireless telemetry unit 46. The hub wireless telemetry unit 46 may facilitate various forms of wireless communication, such as establishing an acoustic wireless link 70 comprising acoustic transmitters, receivers, and transceivers, and/or establishing an inductive or wireless electrical link 72 comprising inductive transmitters, receivers and transceivers. The hub wireless telemetry unit 46 functions to exchange information and in some embodiments power between the hub wireless telemetry unit 46 and a corresponding smart node wireless telemetry unit 34.

Embodiments of each of the smart nodes 30 may include a surface telemetry unit 32 for communicating via the wireline 15 or other communications conduit. In addition, a smart node 30 may further include a smart node wireless telemetry unit 34. As described earlier, the smart node wireless telemetry unit may facilitate various forms of wireless communication, such as establishing an acoustic wireless link 70 comprising acoustic transmitters, receivers, and transceivers, and/or establishing an inductive or wireless electrical link 72 comprising inductive transmitters, receivers and transceivers. As with the hub wireless telemetry unit 46, the smart node wireless telemetry unit 34 may be configured to couple with a corresponding hub wireless telemetry unit 46 to exchange data and/or power.

Although the figures generally show a 1 to 1 relationship between sensor arrays 22, array hubs 40, and smart nodes 30, embodiments of this disclosure may have configurations not expressly shown but within the scope of this disclosure. For example, two or more sensor arrays 22 may be coupled to a single hub 40 and further coupled to a single smart node 30. Depending upon the communication method, in some cases a single smart node 30 may be able to communicate with more than one hub 40. A single sensor system 20 is shown in FIG. 2 to one side of the casing 5, but multiple sensor systems 20 may be placed at different radial intervals around a casing 5 either spaced apart, over lapping or positioned at approximately the same length of the wellbore 1. Also, while the sensors 24 are shown as discrete components, a distributed vibration sensor DVS system using fiber optics may be used to continuously record seismic signals and other parameters along a length of the wellbore 1.

Figure 3:
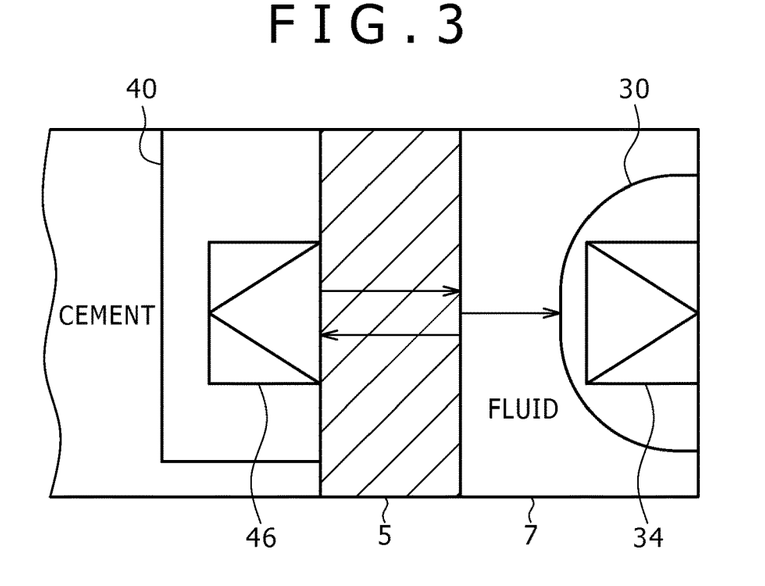
FIG. 3 is a schematic illustration of wireless communication between a hub in cement behind casing and a smart node in fluid located in the wellbore according to an embodiment of the disclosure.

Located behind the casing 5, the array hub 40 may wirelessly communicate with a smart node 30 located inside the well. The wireless communication between the hub wireless telemetry unit 46 and the smart node wireless telemetry unit 34 may have bandwidth limitations inherent with the nature of the physical communication channel. Referring to the exemplary section shown in FIG. 3, the hub wireless telemetry unit 46 located inside the array hub 40 has to transmit and receive communications from the smart node wireless telemetry unit 34 in the smart node 30 through the casing 5. Therefore, it may be difficult, if not impossible to transmit all of the raw data acquired by the sensor array 22 in a reasonable time frame to enable concurrent operations and monitoring. However, with the data processor 42, the array hub 40 may be more likely to facilitate the transmission of a compressed data set made up of seismic events signatures in real time.

Even if the compressed data set is limited in size, embodiments of this disclosure may use various techniques to maximize the wireless channel bandwidth. Turning to the exemplary embodiment shown in FIG. 4, an acoustic window 80 may be provided in the casing 5 between the hub wireless telemetry unit 46 and the smart node wireless telemetry unit 34 to help to increase the channel bandwidth. While in other embodiments, it may be advantageous to orient and align the smart node wireless telemetry unit 34 so as to maximize the coupling between the array hub 40 and the smart node 30. Of course, embodiments are not limited to these two examples and they may be used separately or in combination with other methods.

During an exemplary operation, a sensor system 20 may be installed behind the casing 5 of a treatment wellbore 1 and cemented in place. Prior to the initiation of a stimulation job, one or more smart balls 30 may be lowered into the wellbore 1 via a wireline 15 or other conveyance. The smart nodes 30 are oriented and aligned to wirelessly communicate with the hub wireless telemetry unit 46. As shown in the previous figures, in some embodiments this will involve orienting and aligning the smart nodes 30 to the array hubs 40 so as to enable the smart node wireless telemetry unit 34 to communicate with the hub wireless telemetry unit 46.

The smart node 30, via the smart node wireless telemetry unit 34 may emit a wake up or initiation signal detected by the ultra-low power receiving section 48, which fully wakes up the hub wireless telemetry unit 46. The surface acquisition unit 50 is then able to fully communicate with the hub wireless telemetry unit 46 via the wireline cable 15, the smart ball 30 and the smart node wireless telemetry unit 34, and the acoustic and/or wireless electrical links 70 and 72. The surface acquisition unit 50 can notably send a command so that the hub wireless telemetry unit 46 wakes up the data processor 42. When the data processor 42 is awake, the power consumption level of the sensor system 20 is increased. However, in some embodiments of the current disclosure the energy level contained in the energy storage 44 may be sufficient to power the data processor 42 and corresponding sensor array 22 for the duration of a stimulation job. In other embodiments, the smart node wireless telemetry unit 34 may provide a portion of the energy to power the sensors 24, to recharge the energy storage 44, or both.

During the stimulation job, as formation is being fractured, seismic acoustic signals may reach the sensors 24 of the sensors array 22. These signals are acquired and processed by the data processor 42. The data is compressed into a minimal set of seismic events signatures, which are transferred through the limited bandwidth of the wireless link. Those signatures may then be communicated in real time to the surface acquisition box, via the wireless link and the wireline cable. In some exemplary embodiments, the wireless links 70 & 72 can also be utilized to communicate configuration parameters with the array hub 40, as well as to update firmware in the array hub 40, sensor array 22, and sensors 24.

At the end of the stimulation job, the array hub 40 and the hub wireless telemetry unit 46 can be put back to sleep for later operations, leaving the ultra-low power receiving unit 48 in standby waiting for a wake up or initiation signal.

Referring back to FIG. 1, the exemplary scheme presented herein suggests that multiple sensor arrays 24 can be installed in a single wellbore 1. As would follow, multiple pay zones can be stimulated during one or multiple stimulation jobs. The location and sizes of the sensor arrays 24 may be determined so as to optimize the detection of the seismic events generated by stimulation jobs. During stimulation jobs, the different sensor arrays 24 can be addressed by different smart nodes 30 attached to the same wireline cable 15 as presented in the figure. Alternatively, the different sensor arrays 24 can also be addressed by a single smart ball 30 that is successively located at various depths, to address one sensor array 24 at a time. In an example with multiple pay zones, packing elements may be used so as to hydraulically isolate the separate pay zones that are not monitored.

Some embodiments of this disclosure may have fours modes (for example) of operation defined for the sensor system 20 being powered by energy storage 44. The four modes of operation may be defined for a hydraulic fracture monitoring (HFM) system (such as sensor system 20), namely:
1. Hibernation mode after installation
2. Active mode
3. Acquisition mode
4. Download mode Of course, more or less modes may be used and some of the identified modes may be combined with one another or with modes not expressly stated. For the purposed of explanation, the four modes above will be described in more detail.

Hibernation Mode: The sensor system 20 is installed in the annulus between a casing 5 and a borehole of a wellbore 1. Once installed, the sensor system 20 is put into a low energy hibernation mode. In this mode an ultra-low power receiving unit 48 is kept active to detect and filter a wake-up signal sent by a smart node 30. The sensor system 20 stays in hibernation mode as long as no valid signal is detected by a sensor inside the array hub 40. As soon as a signal sent by the smart node wireless telemetry unit 34 smart node exceeds a threshold or is accepted and is recognized as a signal by a filter in the ultra-low power receiving unit 48, the ultra-low power receiving unity 48 wakes up the hub wireless telemetry unit 46. As a result, the hub wireless telemetry unit 46 causes the array hub 40 to enter into active mode.

Active Mode: Once active mode is initiated, the array hub 40 is able to wirelessly communicate data with the smart node 30. In terms of power consumption, the sensor system 20 (i.e., the energy storage 44) may be designed to allow a few days of operation in this mode. Depending on the progress of the hydraulic fracturing operation, the active mode can be returned to hibernation mode or switched to the acquisition mode.

Acquisition Mode: The acquisition mode may be triggered by a wireless command sent by the smart node 30. In this mode, the sensors 24 and the data processor 42 are operating, sending measured micro seismic event data or reduced sets of processed micro seismic event data to the smart node 30 when seismic events are detected. Seismic events may be created as the hydraulic fracturing operation continues and the fracture grows in size.

In this exemplary situation, the smart node 30 may be sending all of the information transmitted by the array hub 40 to the surface acquisition unit 50 in real time. The information or data provided by the array hub 40 will be transferred via wireline cable 15 or some other communications conduit or technique.

Download Mode: After a period of data acquisition, the download mode can be activated during which a user has the option to download additional parameters stored in the array hub 40. These additional parameters may be related to the hydraulic fracturing operation. In other embodiments, the additional parameters may be used for quality control via the wireless links 70 and 72.

The wireless communications rate may be determined by Shannon's law. This algorithm states the upper limit of a channel's capacity. Several factors may function to limit this rate such as: the frequency bandwidth of transducers in the wireless telemetry units, the noise and signal amplitudes, and the distortion of the signal traveling through the medium. In order to provide an estimate of the loss due to transmission in and through the medium (i.e., cement, wellbore fluids, etc.) and the casing and the impact to the transmission rate, a theoretical study may be performed.

Real time analysis requires designing the highest possible communication rate system between the array hub 40 and a corresponding smart ball 30. This maximum communication rate that may be achieved through a particular channel capacity is provided by Shannon law as follows:

$$C = BW \times \log_2\left(1 + \frac{S}{N}\right)$$

Where: C is the channel capacity,
BW is the bandwidth available for the communication,
S is the received signal power, and
N is the noise power.

Figure 5:
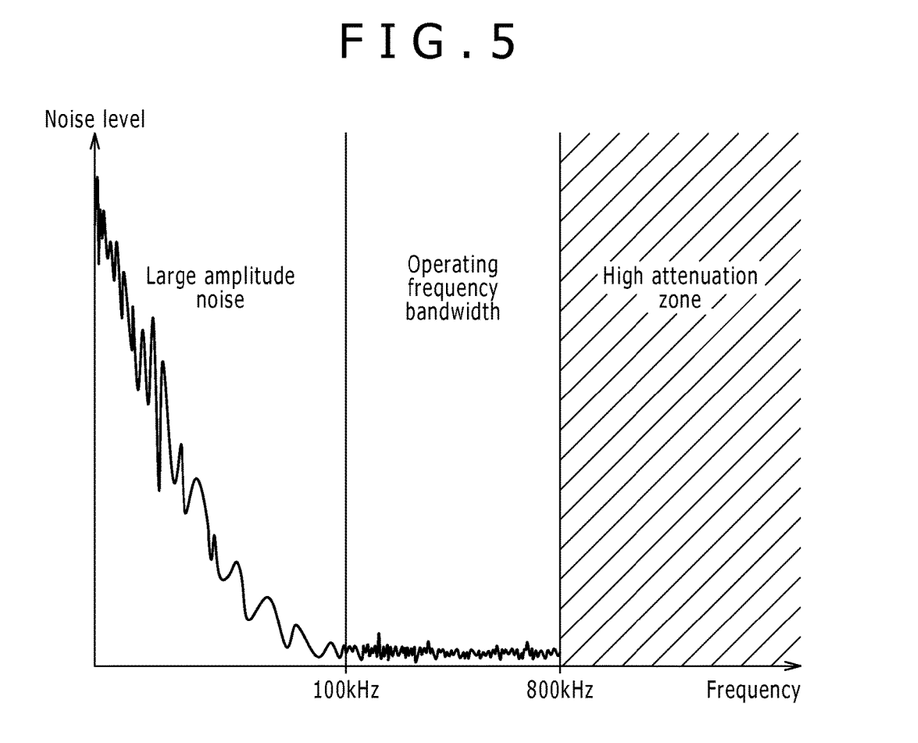
FIG. 5 is a representative graph of noise level versus frequency for wireless communication indicating an area of low signal noise operation between 100 kHz and 800 kHz, according to an embodiment of the disclosure.

One criterion that aids in the design of the wireless telemetry system is to define an appropriate operating frequency band. Such a selection aims at maximizing the signal to noise ratio. Maximization means choosing a high enough frequency band to minimize the noise level while maximizing the received signal. Such a process involves restricting the bandwidth so that is does not infringe on the high attenuation zone of the propagation medium (see for example, FIG. 5, Noise level versus Frequency Graph).

According to the theory, both electromagnetic and acoustic systems can be considered to perform wireless data transmission. However, because the array hub 40 is located behind the casing 5, in some embodiments acoustic transducers may be more efficient and compact for this environment than electromagnetic transducers.

The following calculations are done for an acoustic emitter-receiver of a wireless telemetry unit (34 and 46) operating in a frequency range of 100 to 800 kHz. At such high frequencies, the noise level in the wellbore 1 is very low and the transducers are powerful enough to generate a signal wave through the casing 5. Based on the proposed transducers in one embodiment, two frequencies will be considered, i.e., 300 kHz and 500 kHz for example. In addition, an assumption is made that the transmitted signal is not attenuated into the formation.

The transmitter bandwidth is evaluated in free field for both frequencies. The evaluation result seeks a compromise between the frequency bandwidth, the signal strength, and the noise level. In order to compute the channel capacity the signal to noise ratio is initially estimated: two different cases are now considered and explained as follows:

In favorable conditions, the noise level is low compared to the received signal, for example for a signal to noise ratio of $$\frac{S}{N} \cong 10,$$

Shannon's law yields:

$$C \cong BW \times \log_2(11)$$

If the noise level is high compared to the received signal, the signal to noise level can be estimated as $$\frac{S}{N} \cong 1,$$

to get:

$$C \cong BW$$

Figure 6:
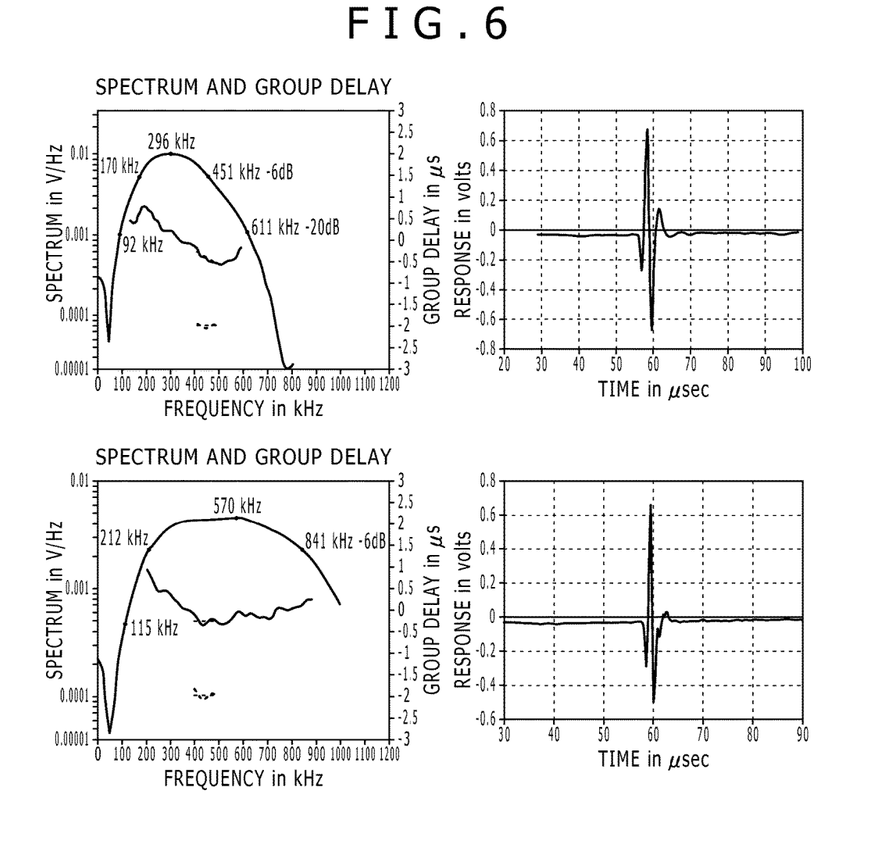
FIG. 6 is a representative set of graphs showing the acoustic transducer characteristics (time and frequency) for central frequencies of 300 kHz and 500 kHz, according to an embodiment of the disclosure.

Furthermore, given the spectrum of the two existing sensors as displayed in FIG. 6, showing acoustic transducer characteristics (time and frequency) for central frequencies of 300 and 500 kHz, the frequency bandwidth for each transmitter can be computed.

The results are summarized as follows in Table 1:

TABLE 1

| Central frequency (kHz) | Bandwidth (kHz) | Low noise level channel capacity (kbit · s$^{-1}$) | High noise level channel capacity (kbit · s$^{-1}$) |
|---|---|---|---|
| 300 | 281 | 972 | 282 |
| 500 | 629 | 2,176 | 629 |

The emitter centered on 500 kHz has a wider frequency bandwidth, hence an improved channel capacity: this confirms that in this example, the higher the central frequency, the more improved the results.

Because of the high number of receivers and the high frequency sampling, the signal measured behind the casing 5 is processed by the data processor 42 to reduce the amount of data sent to the smart node 30 via wireless communication 70 and 72 from the array hub 40. Referring to the general flowchart provided in FIG. 7, an exemplary embodiment of the signal processing workflow 90 performed in the array hub 40 related to the data processor 42 is explained in detail along with the different processes performed within the signal processing workflow 90.

Figure 7:
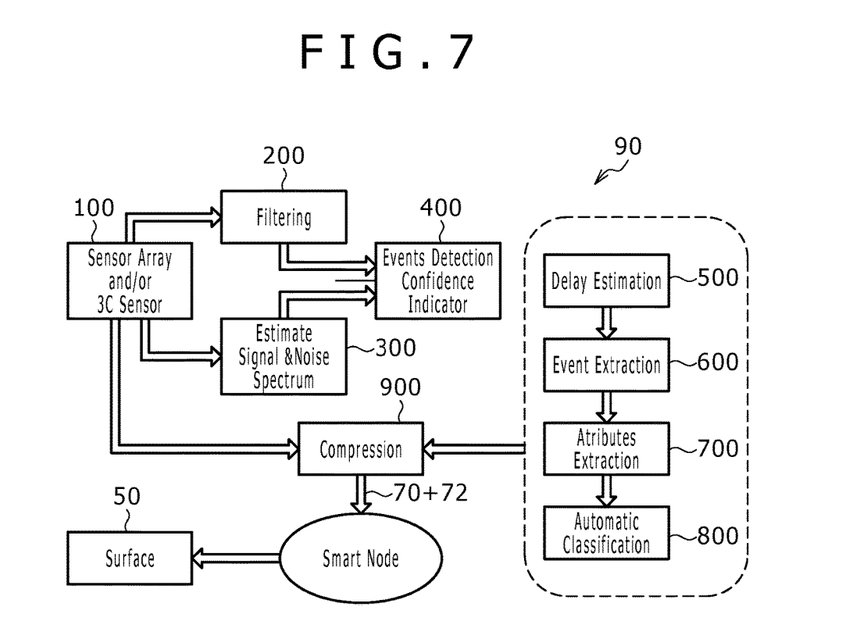
FIG. 7 is an embodiment of a workflow for signal processing performed in the hub according to an embodiment of the disclosure.

The embodiment of the signal processing workflow 90 presented in FIG. 7 is for the purposes of enabling explanation. People of skill will note that this exemplary workflow could be extended or replaced by other functionalities depending on the needs. In addition, these needs could be specific to some type of application, such as a type of formation or to some geometric configuration, among other considerations.

The signal processing workflow 90 includes extracting microseismic events and related information from the digitized raw seismic signals provided by the sensors 24 of the sensor arrays 22. The signal processing workflow 90 operates by processing pairs of frames of 1024 samples from 2 ADC (Analog to Digital Conversion) channels, in this embodiment. The signal processing workflow 90 of an embodiment of the data processor 42 will be described in more detail as follows:

100. Sensor Array and/or 3C (3 Component) Sensors: the sensors 24 of the sensor array 22 record the data.
200. Filtering: the data processor 42 performs an automatic filtering of the recorded data to obtain signal and noise estimates. There are various ways to filter data and a method should be selected that is suitable for the type of data/noise when considered together with the available downhole computing power.
300. Estimate Signal & Noise Spectrum: the signal and noise models may be estimated. Note that the results from process 200 and 300 should be consistent and therefore comparing the two will provide an indication of their quality.
400. Events Detection Confidence Indicator: Knowing the signal and noise model allows the automatic detection of events of interest in the recorded waveforms. At the end of this stage the position of events in the recorded data is known.
500. Delay Estimation: After the identification of the signals of interest, a delay estimation procedure may be performed to estimate the arrival time of the different detected events. These results may be compressed to be sent to the surface acquisition unit 50.
600. Event Extraction: At this stage events are extracted from the waveforms. Note that this process could be done after Events Detection Confidence Indicator. It should not change the delay estimation. These results will be compressed to be sent to the surface acquisition unit 50.
700. Attributes Extraction: At this stage an attribute extraction procedure is performed. Attributes refer to any kind of information that may represent the waveform. Some examples include but are not limited to central frequency, phase, and amplitude etc. These results will be sent to the surface acquisition unit 50 after compression.
800. Automatic Classification: Having determined the attributes for each of the extracted signal, an automatic classification may be performed that will allow regrouping of the different recorded events into different classes related to the different types of fractures that may be generated while fracturing a wellbore 1.
900. Compression: This process involves the data processor 42 compressing the information provided in the previous processes 500, 600, 700, and 800 prior to sending the compressed information to the surface acquisition unit 50. Note that for quality control it may be advantageous to send some waveforms to the surface. At that time one data compression algorithm may be used for everything or one data compression algorithm can be used for processes 500 to 800 and another data compression algorithm can be used for waveform compression.

As previously mentioned, the processing performed by an embodiment of the data processor 42 can be extended with additional functionalities. In addition, a different kind of signal processing workflow can be put in place if specific needs are requested or different than the needs of the exemplary signal processing workflow 90 embodiment.

In order to perform all the calculations involved in the data processor's 42 data reduction process, a sufficiently fast digital signal processor (DSP) may be desired in some embodiments. In some cases, the higher temperatures found downhole in the wellbore 1 can be tolerated by the DSPs by sufficiently down clocking them and properly evacuating their generated heat. These requirements should be considered prior to making a selection for the DSP for the array hub's 40 data processor 42.

Figure 4:
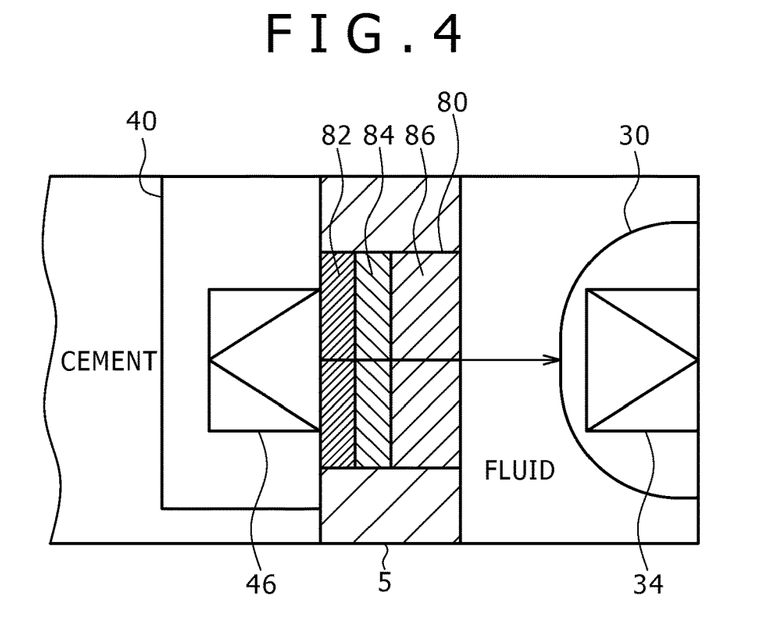
FIG. 4 is a schematic illustration of FIG. 3 showing an embodiment which includes an opening in the casing to facilitate wireless communication between the hub and the smart node and further includes impedance matched layers in the opening, according to an embodiment of the disclosure.

Turning back to FIG. 4, in some embodiments, the transmission between the hub wireless telemetry unit 46 embedded behind the casing 5 and the smart node wireless telemetry unit 34 located in the wellbore 1 may be facilitated by using a window 80 in the casing 5. In the case of such a design, embodiments of the present disclosure retain advantages from providing the sensor system 20 behind the casing 5 without having to sacrifice the channel capacity restrictions of the wireless links 70 and 72 otherwise caused by the casing 5. Use of a window 80 in casing 5 may enable:

Lower noise level in the sensor 24 area: the sensor arrays 22 being located away from the array hub 40 are not directly exposed to the high noise level environment inside of the casing 5 typically generated during a well stimulation or fracturing operation.

Protection of sensors 24: the sensors 24 are not exposed to fluid flow inside of the wellbore 1.

Shorter job operation: the operation time to acquire data during a simulation job is reduced by the presence of the window 80 and is not affected by the deployment of sensor system 20 as the sensor system 20 was installed during the casing 5 placement.

Higher frequency bandwidth data: the coupling between the sensors 24 and the formation 60 is optimal and the window 80 allows allow wireless transmission without significant distortion of the high frequency components The wireless links 70 and 72 between the hub wireless telemetry unit 46 and the smart node wireless telemetry unit 34 may be optimized by providing a window 80 positioned in communications pathway between the wireless telemetry units 34 and 42. Some embodiments of the window 80 may be designed to facilitate the transmission of the acoustic wave in the frequency bandwidth of the wireless telemetry units 34 and 46.

Alternatively, in embodiments in which the implementation of a transducer of the hub wireless telemetry unit 42 is behind a casing 5, impedance matching may be an option to facilitate transmission of data between the array hub 40 and the smart node 30. Impedance matching may yield the power transmission factors listed in the following Table 2:

TABLE 2

| Central frequency f (kHz) | Power transmission coefficient $T_\pi$ |
|---|---|
| 300 | 0.0456 |
| 500 | 0.135 |

Impedance matching may use a buffer material 82, 84, and 86, for example, between the hub wireless telemetry unit 46 and the wellbore fluid 7. In some embodiments, two options may be used to achieve an impedance match between the transducer and the borehole fluid: one by using a multi-layers material with thicknesses of ¼ the wavelengths of the emitted signal or using a transition material having a acoustic impedance gradient composed by the emitter impedance of the hub wireless telemetry unit 42 on one side and gradually changing to match the borehole fluid impedance at the end. Of course, other options may be used and these are discussed for the purpose of explanation.

Some embodiments of the transducer (transmitter/receiver) implemented in the smart node wireless telemetry unit 34 of the smart node 30 are used to communicate with the array hub 40 behind the casing 5. When the smart node 30 is lowered in the wellbore 1 and faces the array hub 40, the wireless communication between the smart node 30 and the array hub 40 may happens as follows.

The transducer in the smart node wireless telemetry unit 34 of the smart node 34 may initially transmit a specified modulation or sequence code to wake up the array hub 40 (e.g., into active mode).

When the array hub 40 is awake, the transducer in the smart node wireless telemetry unit 34 may be used to transmit and receive data to and from the hub wireless telemetry unit 46.

Note that the same smart node transducer may be used in both processes.

In other embodiments, the smart node 30 may be able to rotate in the wellbore 1 and detect the position of the hub wireless telemetry unit 46 located behind the casing 5 by tracking, for example, an acoustic signal of a wave reflecting from the casing window 80 previously defined. Note that any kind of predefined signature may be used to position the smart node 30 (e.g., geometric form, etc. . . . ). Alternative embodiments may comprise a smart node 30 with various azimuthal transducers (e.g., the angle/distance between the azimuthal transducers can be changed depending on particular needs) in which an azimuthal transducer is selected that has the best alignment with the hub wireless telemetry unit 46 located behind the casing 5 (this detection may be done by analyzing recorded signals at each azimuth).

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A downhole monitoring system is provided that comprises:
   a sensor system located in an annulus formed between a borehole wall and an exterior surface of a casing, comprising;
   a sensor array comprising a plurality of sensors;
   a hub communicatively coupled to the sensor array comprising;
      an energy storage;
      a hub wireless telemetry system;
      a data processor; and
   a smart node located in the wellbore formed by the casing and comprising;
      a smart node wireless telemetry system;
      a surface telemetry unit communicatively coupled to a surface acquisition unit;
   wherein the hub is configured to provide power to the sensor system, process data from the sensors of the sensor array and wirelessly communicate the processed data to the surface acquisition unit via the smart node and the surface telemetry unit;
   wherein the casing comprises an acoustic window to facilitate wireless communications between the hub and the smart node.

2. The downhole monitoring system of claim 1 in which the hub further comprises at least one low energy operational mode and one higher energy operational mode.

3. The downhole monitoring system of claim 1 in which the smart node wirelessly provides energy to the hub.

4. The downhole monitoring system of claim 1 in which the smart node switches an operational mode of the hub from a low energy operational mode to a higher energy operational mode.

5. The downhole monitoring system of claim 1 in which the hub compresses the processed data from the sensors prior to communicating the data with the communication devices.

6. The downhole monitoring system of claim 1 in which two or more sensor systems are cemented in the annulus formed between the borehole wall and the casing.

7. The downhole monitoring system of claim 1 in which the sensors detect microseismic signals generated during hydraulic fracturing.

8. A method for sensing micro-seismic activity during a hydraulic fracturing operation comprising:

cementing a sensor system comprising a sensor array and a hub into an annulus defined between an interior of a borehole wall and an exterior of a casing;
positioning, proximate to the hub, a smart node communicatively coupled to a surface acquisition unit;
initiating wireless communications between the hub and the smart node;
performing a hydraulic fracturing operation;
compressing data received in the hub from sensors of the sensor array;
wirelessly communicating the compressed data to the smart node; and
monitoring fracture propagation in real time at the surface acquisition unit during the hydraulic fracturing operation due to the compressed data received by the smart node;
wherein cementing the sensor system comprises cementing two or more sensor systems;
wherein there is a corresponding number of smart nodes for the two or more sensor systems.

9. The method of claim 8 further comprising:
wirelessly providing power to the hub from the smart node.

10. The method of claim 8 further comprising:
positioning the hub of the sensor system near an acoustic window in the casing to facilitate wireless communication between the hub and the smart node.

11. The method of claim 10 further comprising:
providing impedance matched buffer material in the acoustic window.

12. The method of claim 8 wherein the smart node is positioned via a wireline.

13. A sensor system comprising:
a sensor array configured to be permanently mounted in an annulus formed between a borehole wall and an exterior surface of a casing, wherein the sensor array comprises;
a plurality of sensors configured to record parameters of a surrounding formation as data; and
a hub configured to receive the data from the plurality of sensors comprising;
an energy storage;
a data processor;
a hub wireless telemetry communications unit configured to wirelessly communicate with a smart node;
wherein the hub processes the data from the plurality of sensors into a compressed data set for wireless communications with a smart node;
wherein the casing comprises an acoustic window to facilitate wireless communications between the hub and the smart node.

14. The sensor system according to claim 13 wherein the wireless communication of the hub wireless telemetry communications unit is acoustic.

15. The sensor system according to claim 13 wherein the wireless communication of the hub wireless telemetry communications unit is electrical.

16. The sensor system according to claim 13 wherein there are two or more sensor arrays communicatively coupled to the hub.

17. The sensor system according to claim 13 wherein the hub has a low energy operational mode.

* * * * *